US009068798B2

United States Patent
Maryfield et al.

(10) Patent No.: US 9,068,798 B2
(45) Date of Patent: Jun. 30, 2015

(54) INTEGRATED MULTIFUNCTION SCOPE FOR OPTICAL COMBAT IDENTIFICATION AND OTHER USES

(75) Inventors: Tony Maryfield, Poway, CA (US); Mahyar Dadkhah, San Diego, CA (US); Thomas Potendyk, Manassas, VA (US)

(73) Assignee: Cubic Corporation, San Diego, CA (US)

( * ) Notice: Subject to any disclaimer, the term of this patent is extended or adjusted under 35 U.S.C. 154(b) by 841 days.

(21) Appl. No.: 13/186,058

(22) Filed: Jul. 19, 2011

(65) Prior Publication Data

US 2014/0109458 A1    Apr. 24, 2014

Related U.S. Application Data (60) Provisional application No. 61/365,517, filed on Jul. 19, 2010.

(51) Int. Cl.
| | |
|---|---|
| *F41G 1/38* | (2006.01) |
| *G01S 17/74* | (2006.01) |
| *F41G 3/26* | (2006.01) |
| *G01S 17/00* | (2006.01) |

(Continued)

(52) U.S. Cl.
CPC . *F41G 1/38* (2013.01); *G01S 17/00* (2013.01); *F41G 1/473* (2013.01); *F41G 1/54* (2013.01); *G01S 17/023* (2013.01); *G01S 17/74* (2013.01)

(58) Field of Classification Search
CPC ............. F41G 1/473; F41G 1/54; F41G 1/83; G01S 17/00; G01S 17/023; G01S 17/74
USPC ........ 42/119, 142; 89/1.11; 356/3, 3.01, 4.01, 356/5.01; 398/128, 189; 434/1, 11, 16, 19, 434/21, 22, 27
See application file for complete search history.

(56) References Cited

U.S. PATENT DOCUMENTS 3,464,770 A * 9/1969 Schmidt ....................... 356/4.01
3,989,942 A   11/1976 Waddoups (Continued)

FOREIGN PATENT DOCUMENTS

| EP | 1154532 A | 11/2001 |
|---|---|---|
| EP | 1286440 A | 2/2003 |
| GA | 2681143 A | 3/1993 |

OTHER PUBLICATIONS

EP Supplemental Search Report mailed Mar. 20, 2009; Application 08020275.7-2220, all pages.

(Continued)

*Primary Examiner* — Bret Hayes
(74) *Attorney, Agent, or Firm* — Kilpatrick Townsend & Stockton LLP (57) ABSTRACT

Systems and methods for enabling an integrated multifunction scope for optical combat identification and other uses. The functionality of Multiple Integrated Laser Engagement System (MILES) is combined with Optical Combat Identification Systems (OCIDS) or other identification as friend or foe (IFF) systems. This can provide for improved MILES performance through the utilization of a common laser transmission system and/or the use of location information systems, such as global positioning system (GPS) coordinates. According to some embodiments, various additional features may be included for use in training and/or combat environments.

7 Claims, 7 Drawing Sheets

(51) Int. Cl.
*F41G 1/473* (2006.01)
*F41G 1/54* (2006.01)
*G01S 17/02* (2006.01)

(56) References Cited

U.S. PATENT DOCUMENTS

| | | | |
|---|---|---|---|
| 4,054,794 A | 10/1977 | Laughlin et al. | |
| 4,136,956 A | 1/1979 | Eichweber | |
| 4,143,263 A | 3/1979 | Eichweber | |
| 4,218,834 A * | 8/1980 | Robertsson | 434/21 |
| 4,249,265 A | 2/1981 | Coester | |
| 4,690,550 A * | 9/1987 | Kuhne | 356/5.01 |
| 4,731,879 A | 3/1988 | Sepp et al. | |
| 4,847,481 A | 7/1989 | Altmann | |
| 4,866,781 A | 9/1989 | Borken et al. | |
| 4,917,609 A * | 4/1990 | Eichweber | 434/20 |
| 4,937,795 A | 6/1990 | Motegi et al. | |
| 5,142,288 A | 8/1992 | Cleveland | |
| 5,166,507 A | 11/1992 | Davis et al. | |
| 5,241,314 A | 8/1993 | Keeler et al. | |
| 5,274,379 A | 12/1993 | Carbonneau et al. | |
| 5,299,227 A | 3/1994 | Rose | |
| 5,329,467 A | 7/1994 | Nagamune et al. | |
| 5,426,295 A | 6/1995 | Parikh et al. | |
| 5,448,045 A | 9/1995 | Clark | |
| 5,448,847 A | 9/1995 | Teetzel | |
| 5,459,470 A | 10/1995 | Wootton et al. | |
| 5,476,385 A | 12/1995 | Parikh et al. | |
| 5,648,862 A | 7/1997 | Owen | |
| 5,669,174 A * | 9/1997 | Teetzel | 42/115 |
| 5,681,008 A * | 10/1997 | Kinstler | 244/3.11 |
| 5,686,722 A | 11/1997 | Dubois et al. | |
| 5,819,164 A | 10/1998 | Sun et al. | |
| 5,870,215 A | 2/1999 | Milano et al. | |
| 5,966,226 A | 10/1999 | Gerber | |
| 5,966,227 A | 10/1999 | Dubois et al. | |
| 5,978,141 A | 11/1999 | Karwacki | |
| 5,986,790 A | 11/1999 | Ota et al. | |
| 6,097,330 A | 8/2000 | Kiser | |
| 6,154,299 A | 11/2000 | Gilbreath et al. | |
| 6,219,596 B1 | 4/2001 | Fukae et al. | |
| 6,239,901 B1 | 5/2001 | Kaneko | |
| 6,450,816 B1 | 9/2002 | Gerber | |
| 7,308,202 B2 | 12/2007 | Roes et al. | |
| 7,489,865 B2 | 2/2009 | Varshneya et al. | |
| 7,720,388 B2 | 5/2010 | Varshneya et al. | |
| 7,983,565 B2 | 7/2011 | Varshneya et al. | |
| 8,051,597 B1 * | 11/2011 | D'Souza et al. | 42/119 |
| 8,125,371 B1 * | 2/2012 | Daniel | 342/45 |
| 8,597,025 B2 * | 12/2013 | Belenkii et al. | 434/19 |
| 2001/0017724 A1 | 8/2001 | Miyamoto et al. | |
| 2001/0035995 A1 | 11/2001 | Ruggiero | |
| 2002/0089729 A1 | 7/2002 | Holcombe | |
| 2003/0072343 A1 | 4/2003 | Murray et al. | |
| 2004/0075880 A1 | 4/2004 | Pepper et al. | |
| 2005/0233284 A1 * | 10/2005 | Traykov et al. | 434/16 |
| 2008/0233543 A1 * | 9/2008 | Guissin | 434/19 |
| 2009/0245788 A1 * | 10/2009 | Varshneya et al. | 398/33 |
| 2011/0183300 A1 * | 7/2011 | McNeish et al. | 434/22 |

OTHER PUBLICATIONS

EP Supplemental Search Report mailed Mar. 24, 2009; Application 08020276.5-2220, all pages.

\* cited by examiner

INTEGRATED MULTIFUNCTION SCOPE FOR OPTICAL COMBAT IDENTIFICATION AND OTHER USES

The present application claims benefit under 35 USC 119 (e) of U.S. Provisional Application No. 61/365,517, filed on Jul. 19, 2010 of which the entire disclosure is incorporated herein by reference for all purposes.

The present application further incorporates by reference, in its entirety, U.S. Pat. No. 7,983,565, filed on Dec. 10, 2008, entitled "Integrated Optical Communication and Range Finding System and Application Thereof."

BACKGROUND

Multiple Integrated Laser Engagement System (MILES) is a modern, realistic force-on-force training system. An exemplary MILES system is the MILES 2000® system produced by Cubic Defense Systems, Inc. As a standard for direct-fire tactical engagement simulation, MILES 2000 is used by the United States Army, Marine Corps, and Air Force. MILES 2000 has also been adopted by international forces such as NATO, the United Kingdom Ministry of Defense, the Royal Netherlands Marine Corps, and the Kuwait Land Forces.

MILES and other combat training and simulation systems typically are separate from Optical Combat Identification Systems (OCIDS) and other identification as friend or foe (IFF) systems. Combat-ready weapons equipped with OCIDS, for example, must be reconfigured with MILES systems each time they are to be used in training. Similarly, training-ready weapons must be reconfigured with OCIDS before they are used in combat.

BRIEF SUMMARY

Systems and methods are provided for enabling an integrated multifunction scope for optical combat identification and other uses. The functionality of a training/simulation unit, such as Multiple Integrated Laser Engagement System (MILES) is integrated with an identification as friend or foe (IFF) system, such as an Optical Combat Identification System (OCIDS). Besides providing the added convenience of an integrated unit functional in both training and combat environments, the invention can provide an integrated laser system that utilizes a global positioning system (GPS) and/or common laser wavelengths for improved MILES performance and functionality. According to some embodiments, various additional features may be included for use in training and/or combat environments.

An embodiment of a weapon-mounted optical scope configured to operate in a combat mode and a training mode, according to the disclosure can comprise an observation telescope configured for viewing of an image of a target a laser transceiver coupled to the observation telescope and configured to communicate using an optical signal, and an identity determination unit communicatively coupled to the laser transceiver and configured to make a determination regarding the target based, at least in part, on identification information received using the laser transceiver. The weapon-mounted optical scope further can include a simulation unit communicatively coupled to the laser transceiver and configured to transmit simulation information, using the laser transceiver, when the weapon-mounted optical scope is operating in the training mode. Finally the weapon-mounted optical scope can include a location information unit communicatively coupled with the simulation unit and configured to calculate location information indicative of a location of the weapon-mounted optical scope.

The weapon-mounted optical scope also can include one or more of the following features. The simulation unit can be configured to include the location information in the simulation information. The laser transceiver can be configured to receive data indicative of the location of a receiver unit, and communicate the data to the simulation unit, and the simulation unit can be configured to use the data and the location information to determine a distance of the receiver unit. The simulation unit can be configured to transmit distance information regarding the distance of the receiver unit using the laser transceiver. An indicator can be configured to communicate to a user whether the weapon-mounted optical scope is operating in the training mode. A radio frequency (RF) unit can be configured to transmit the location information. The laser transceiver can be configured to generate a laser beam having a wavelength of approximately 1550 nm. The location information unit can comprise a global positioning system (GPS) receiver.

An embodiment of a method for determining a distance of a receiver unit from a multifunction scope, according to the disclosure, can include transmitting a first optical signal with the multifunction scope, in conjunction with the simulated firing of a weapon and receiving a second optical signal. The second optical signal can include first location information indicative of a location of the receiver unit. The method also can include determining second location information indicative of a location of the multifunction scope, and calculating the distance of the receiver unit from the multifunction scope using the first location information and the second location information.

The method for determining a distance of a receiver unit from a multifunction scope also can include one or more of the following features. A third optical signal can be transmitted with the multifunction scope. The third optical signal can include data indicative of the distance of the receiver unit from the multifunction scope. A determination can be made regarding a target associated with the receiver unit based, at least in part, on the second optical signal. An indication of whether the multifunction scope is operating in a training mode can be made. Data indicative of the distance of the receiver unit from the multifunction scope can be transmitted using an RF signal. The distance of the receiver unit from the multifunction scope can be displayed. A lethality associated with the simulated firing of the weapon can be calculated. Data indicative of the lethality can be transmitted using an RF signal.

An embodiment of a multifunction scope, according to the disclosure, can include an observation component configured for viewing of an image of a target, an identification component configured to make a determination regarding an identity of the target, an optical transmission component configured to transmit a first optical signal in conjunction with the simulated firing of a weapon, an optical receiving component configured to receive first location information representing a location of a receiver unit from a second optical signal, a location information component configured to determine second location information representing a location of the multifunction scope, and a calculation component configured to calculate a distance of the receiver unit from the multifunction scope using the first location information and the second location information.

The multifunction scope can include one or more of the following features in addition. The optical transmission component can be configured to transmit a third optical signal including data representing the distance of the receiver unit from the multifunction scope. An RF transmission component can be configured to transmit information representing the distance of the receiver unit from the multifunction scope.

DETAILED DESCRIPTION

The ensuing description provides embodiment(s) only, and is not intended to limit the scope, applicability or configuration of the disclosure. Rather, the ensuing description of the embodiment(s) will provide those skilled in the art with an enabling description for implementing a embodiment. It being understood that various changes may be made in the function and arrangement of elements without departing from the spirit and scope of this disclosure.

Multiple Integrated Laser Engagement Systems (MILES), such as MILES 2000, include wearable systems for individual soldiers and marines as well as devices for use with combat vehicles (including pyrotechnic devices), personnel carriers, antitank weapons, and pop-up and stand-alone targets. The MILES 2000 laser-based system can be mounted on a weapon to allow troops to fire infrared "bullets" from the same weapons and vehicles that they would use in actual combat. These simulated combat events produce realistic audio/visual effects and casualties, identified as a "hit," "miss," or "kill." Upon detecting a signal from a weapon-mounted transmitter unit, a receiver unit can calculate the lethality of a simulated "hit" based on the type of weapon and its distance from the receiver unit using a microprocessor or other processing device.

Combat training systems such as MILES are typically utilized in training environments only. Thus, the wearable systems and other devices associated with the training systems may be replaced with combat-ready equipment, such as IFF systems including OCIDS. These IFF systems are known in the art for military aircraft and other weapons systems, and have recently been introduced for the dismounted soldier. See, for instance, U.S. Pat. No. 7,983,565, filed on Dec. 10, 2008, entitled "Integrated Optical Communication and Range Finding System and Application Thereof," which is incorporated in its entirety for all purposes. IFF systems can include laser systems that generate and interrogation signal of optical pulses which are aimed at a remote target. The remote target, if equipped with a responding system, can add identification or other information to the interrogation signal and return the modified interrogation signal as a response signal to the laser system, which processes the response signal to identify the remote target.

Embodiments of the present invention include a multifunction scope that can integrate MILES and IFF systems to increase the capabilities of the MILES. For example, a MILES receiver unit may currently measure light loss to determine the distance of a weapon-mounted transmitter unit and calculate the lethality of a kill. However, varying atmospheric conditions may alter the light loss, and thereby adversely affect the accuracy of the MILES. In contrast, by utilizing the communication capabilities of an IFF system, the multifunction scope can communicate additional information during MILES training, such as the distance and/or location of the weapon-mounted transmitter unit. The receiver unit can be similarly adjusted to receive such communication and thereby dramatically increase the accuracy of MILES and/or similar systems.

In the above embodiment, location and/or distance may be calculated in various ways. The multifunction scope, for example, may utilize range finding technologies to calculate distance to a receiver unit. Alternatively, the multifunction scope may be coupled with one or more location information units that can provide location information, such as a GPS receiver, and simply transmit its location (e.g., coordinates) to a receiver unit. The receiver can utilize the distance and/or location information to calculate a lethality of the corresponding shot. Moreover, the receiver can communicate the results of the lethality calculation to a central system using a radio or other communication means.

Additionally or alternatively, the receiver unit can communicate information, such as identification information and/or location information back to the multifunction scope. For example, the receiver unit can comprise a modulating retroreflector (similar to those found in IFF responding systems) configured to communicate identification and/or location information by modulating a laser signal sent from the multifunction scope. To provide location information, the receiver unit additionally can include a GPS receiver.

The laser capabilities of the MILES functionality in a multifunction scope described herein can also improved by utilizing the laser hardware of the IFF system. For example, conventional MILES systems typically use lasers with 904 nm wavelengths, which can be harmful to the human eye and suffer from atmospheric attenuation that can dramatically reduce the range of the MILES system depending on various atmospheric conditions. On the other hand, IFF systems can utilize lasers with 1550 nm lasers. Not only are the 1550 nm lasers less harmful to the human eye, they are less susceptible to attenuation due to varying atmospheric conditions, and can be used over longer ranges. Thus, by integrating a 1550 nm IFF laser system into a MILES system of a multifunction scope, the resulting MILES functionality of the multifunction scope can have increased performance while posing less of a danger to users.

The range and reliability of a MILES functionality in a multifunction scope further can be improved when integrated with GPS. The lethality of a simulated "hit" is determined not only by where the simulated bullet hits the target, but also by the distance of the target from the weapon-mounted multifunction scope. Because beam spreading and other effects on a laser beam can vary due to different atmospheric conditions, the use of GPS to determine the distance of the target from the weapon can be more accurate than a range determined by a laser. It also can eliminate the need of a receiver unit on the target to return information to the multifunction scope. For example, in connection with the firing of a simulated bullet, the multifunction scope can communicate identification and/or location information to the receiver unit, which can use the information to calculate lethality. For example, the receiver unit can calculate distance using location information of the multifunction scope and the receiver unit. Alternatively, the receiver unit can use identification information to receive location information form a central system, which can maintain and/or receive current location information of the multifunction scope.

The multifunction scope also can utilize radio frequency (RF) capabilities of communication units used in combat to improve MILES functionality. Conventional MILES systems often utilize Very High Frequency (VHF) radio transmitters to communicate information to a central system. However, because VHF is optimal for only short-distance terrestrial communication, the VHF radio transmitters can require the use and setup of radio towers. On the other hand, by integrating an RF unit used in combat, such as a tactical radio, into the multifunction scope, MILES-related information can be relayed to a squad radio, and back to a central system, without the need for separate radio towers. Information, such as location data, can be communicated automatically or manually (e.g., voice).

The multifunction scope contemplated by the present invention presents various other advantages over prior systems. For instance, by combining IFF with MILES functionality, the resulting multifunction scope is much lighter in weight. Additionally, for systems mounted on weapons such as rifles, the multifunction scope provides better balance of the weapon. This is because MILES systems typically use laser transmitters mounted on or near the end of a barrel, causing the weapon to be front heavy. Furthermore, there is no need to adjust or reequip weapons during the transition from training to combat. Because the multifunction scope described herein may be used in both training and combat environments, there is no need to physically replace equipment.

Embodiments of the present invention can further provide for a MILES activation unit that activates the MILES and ensures the safe and secure transition from training to combat mode. The MILES activation unit can comprise a physical unit that may only be activated/deactivated by a soldier or commander having a physical key. Additionally or alternatively, sensors can be used to detect whether live and/or blank rounds have been inserted into the chamber of the weapon and/or whether the weapon's safety is engaged. It will be understood that there are numerous additional ways in which the MILES activation unit may be triggered to activate or deactivate the MILES. A simple switch, for example, also may be used.

Figure 1:
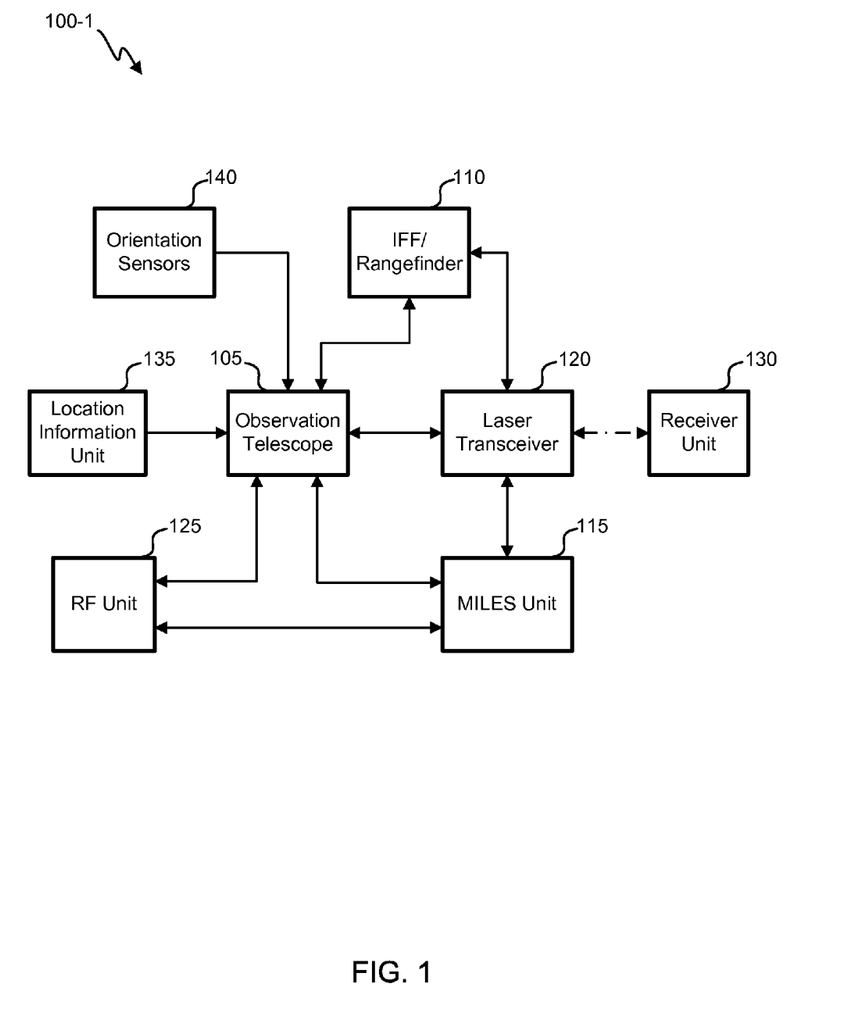
FIG. 1 is a block diagram of an embodiment of the present invention with a MILES system activated.

Referring first to FIG. 1, a block diagram of an embodiment of a multifunction scope 100-1 in a training mode (e.g., the MILES unit 115 is activated) is shown. This embodiment incorporates a observation telescope 105 with an IFF/rangefinder 110 and MILES unit 115. According to this embodiment, the IFF/rangefinder 110 and MILES unit 115 utilize a single laser transceiver 120 for IFF, range finding, and MILES functionality. The laser transceiver 120 may comprise a laser transmitter and one or more optical sensors for receiving optical transmissions. In some embodiments, the laser transmitter uses a laser that generates light having a wavelength of 1550 nanometers, but lasers generating other wavelengths, including 904 nm, may be used. Additionally, a visible laser (e.g., red-spotting laser) can be integrated into the multifunction scope 100-1, used for aiming a weapon to which the multifunction scope 100-1 is coupled. The present invention contemplates numerous ways of integration, including embodiments (not shown) in which MILES functionality is wholly incorporated into the IFF/rangefinder 110. Furthermore, one or more of the components depicted in the figures can include hardware and/or software for communicating with other components to provide for the integration and functionality of the multifunction scope 100-1. With this understanding, one or more of the components shown in FIG. 1 and other figures may be physically and/or logically combined or separated, without departing from the spirit of the disclosure provided herein.

The observation telescope 105 allows viewing in a typically magnified way, a distant target. The target could be a combat, training, or hunting target. The observation telescope 105 could be, for example, mounted on a tripod, a vehicle, or the weapon. Various embodiments can have different components mounted to the observation telescope 105, but generally there are mechanisms to determine distance or range to the target from the weapon and/or the observation telescope 105 along with a way to automatically gather location information.

The multifunction scope 100-1 of FIG. 1 further includes a radio frequency (RF) unit 125 communicatively coupled with the MILES unit 115. As discussed earlier, the RF unit 125 can be a tactical radio communicatively coupled with a squad radio that can relay information from the MILES unit 115 to a central system. Additionally or alternatively, the laser transceiver 120 can communicate MILES and/or IFF information to receiver unit 130, which can relay the information to the central system. In either case, the information communicated via the RF unit 125 and/or the laser transceiver 120 can include weapon, range, identification, and other information.

The observation telescope 105 has ability to display certain status information that can include the status of the MILES functionality (e.g., whether MILES is activated or not), distance to an object, and/or whether a receiver unit 130 has been identified by the IFF/rangefinder 110. The display (not shown) of the observation telescope 105 could be viewable through an eyepiece of the observation telescope 105, with a integral display elsewhere on the observation telescope 105, and/or on a display separate from the observation telescope 105.

A location information unit 135 and orientation sensors 140 are coupled to the observation telescope 105 in this embodiment to determine location. As discussed above, the location information unit 135 can include GPS and/or other location systems. The orientation sensors 140 can include a compass, inclinometer, and/or other systems, which can sense the azimuth and elevation angles of the observation telescope 105. In addition or as an alternative to a magnetic compass, orientation sensors 140 can include a celestial compass, such as those made by Trex Enterprises Corporation, of San Diego, Calif., which can accurately determine orientation from images of celestial objects.

Figure 2:
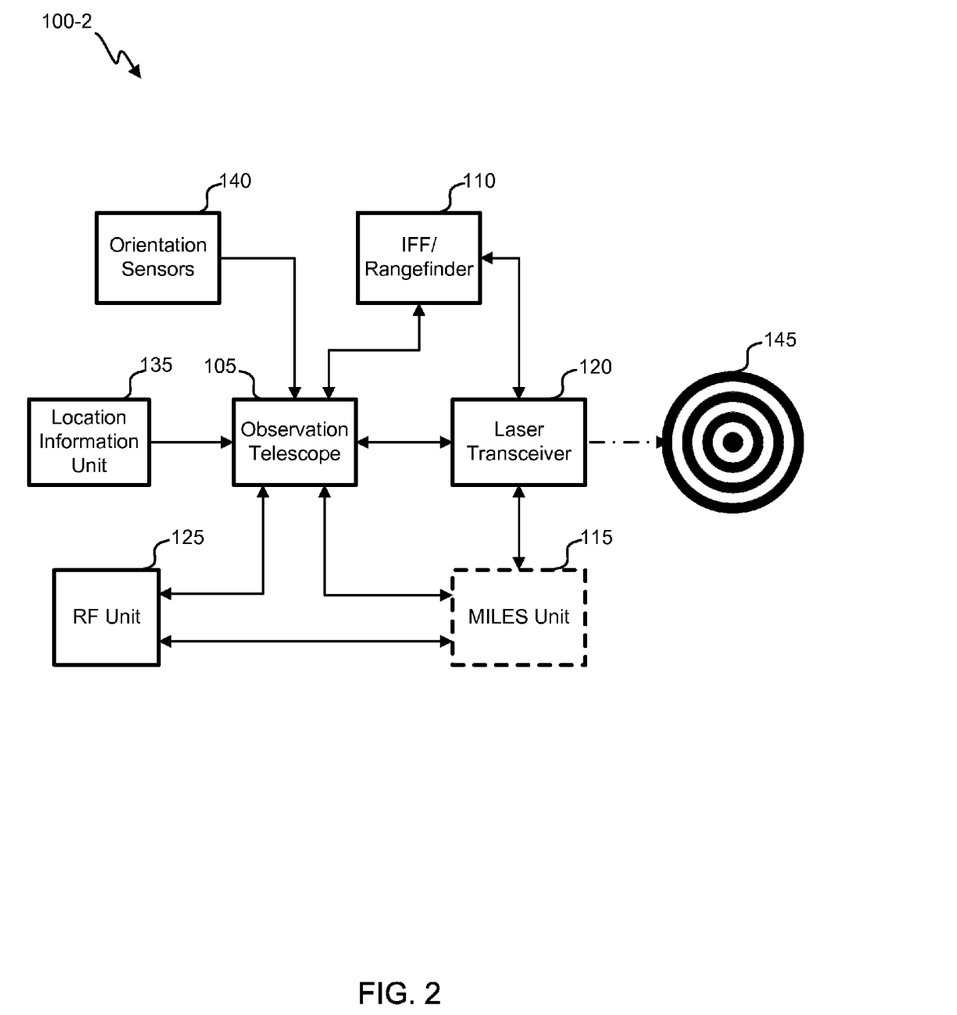
FIG. 2 is a is a block diagram of an embodiment of the present invention with a MILES system deactivated.

FIG. 2 is a is a block diagram of an embodiment of a multifunction scope 100-2 with a MILES unit 115 deactivated. The multifunction scope 100-2 in this state is combat ready and may identify a target 145 for IFF identification, range finding, and/or target designation. For example, with the location of the observation telescope 105, a distance to a target provided by the IFF/rangefinder 110, and orientation information gathered from orientation sensors 140, the location of the target 145 can be determined automatically. The location of the target 145 can be relative to a location of the observation telescope 105, or it may contain absolute coordinates. This information can be communicated electronically to a central system and/or other military units for calling in weapons fire to the location of the target 145 without the use of a laser designator.

Figure 3:
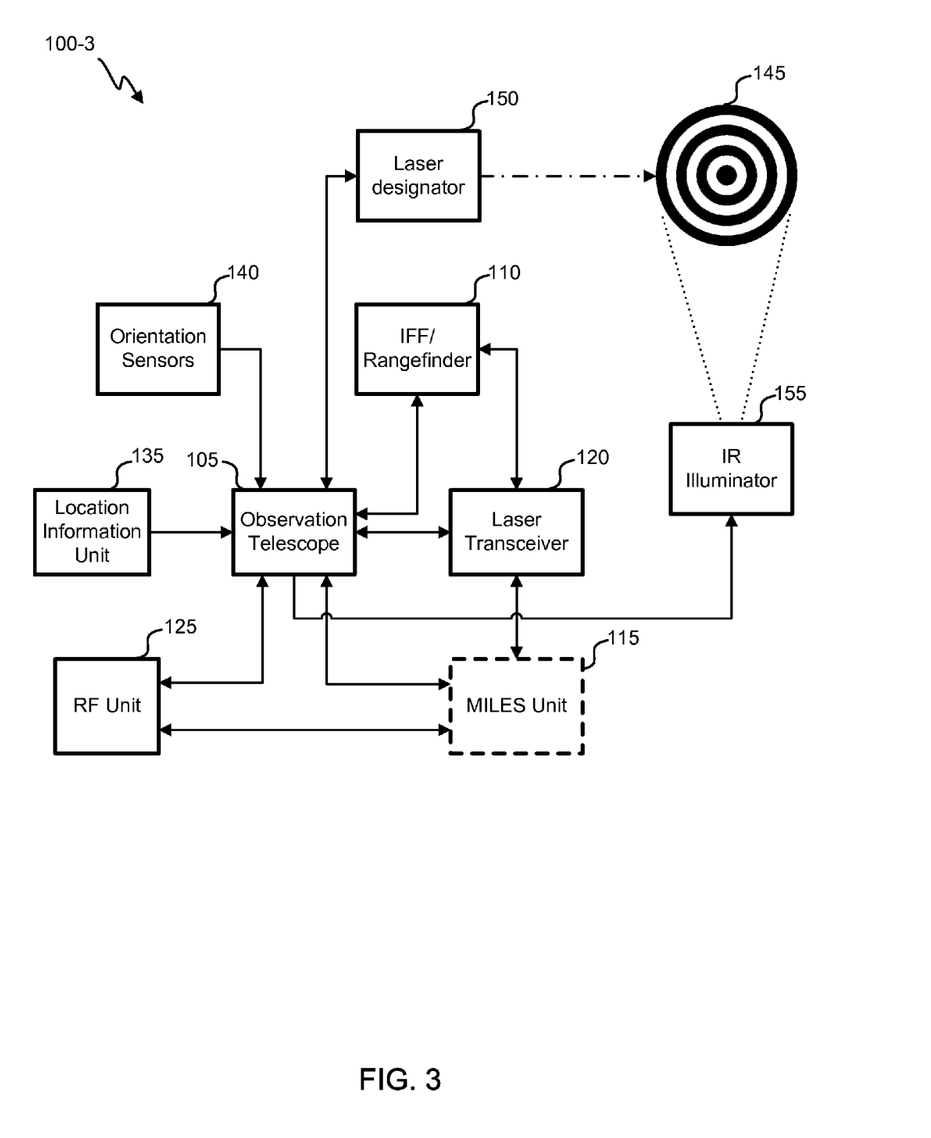
FIG. 3 is a is a block diagram of an embodiment of the present invention incorporating a laser designator and an IR illuminator.

FIG. 3 is a is a block diagram of an embodiment of a multifunction scope 100-3 of the incorporating a laser designator 150 and an IR illuminator 155. This embodiment has the capability to designate a target remotely using a laser. A laser designator 150 is aligned with the line-of-sight of the observation telescope 105 to create an illumination point on the target such that a local and/or remote weapon can fire at the illumination point. Often a non-visible wavelength is used by the laser designator 150 to avoid the target 145 knowing of the designation. The observation telescope 105, however, is able to detect the wavelength of the illumination point and show the illumination point on its display. Other parties with equipment sensitive to the illumination point's wavelength also can see the illumination point to aim their weapon. Additionally, certain weapons can guide themselves to the illumination point.

Range to the target along the line-of-sight can be determined by laser ranging or other ranging techniques, provided by the IFF/Rangefinder 110 or the laser designator 150. Moreover, in some embodiments the laser designator 150, IFF/rangefinder 110 and laser transceiver 120 can be integrated into a single component using a single laser.

Additionally, the multifunction scope 100-3 illustrated in FIG. 3 includes an IR illuminator 155 that can be coupled with the observation telescope 105. The IR illuminator 155 can provide illumination of a target for infrared/night vision detection by the observation telescope 105 and/or other infrared sensors.

Figure 4:
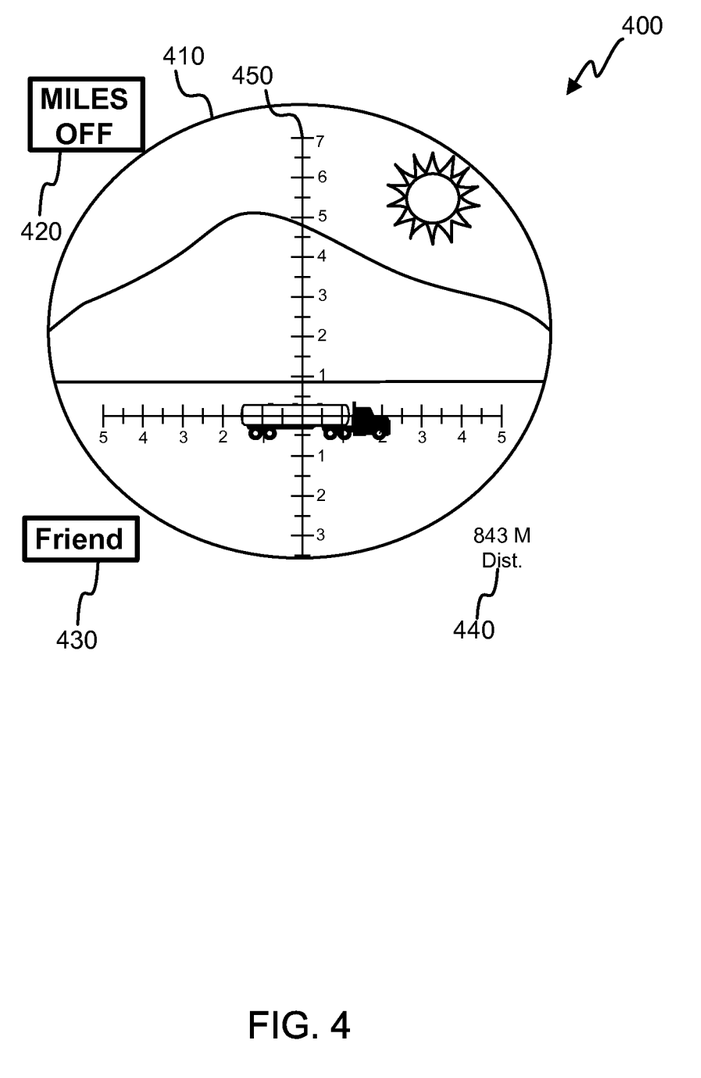
FIG. 4 is a simplified illustration of an image visible through a viewfinder of a multifunction scope, according to one embodiment.

FIG. 4 is a simplified illustration of an image 400 visible through a viewfinder of an observation telescope 105 of the multifunction scope 100, according to one embodiment. Part of the image 400 shows a target scene 410, which could be directly relayed through optics or could be displayed on a screen for indirect viewing of an observed image. In this embodiment, the observation telescope 105 uses an electronic display to show the image 400 and other information. This embodiment includes MILES status indicator 420, a friend or foe status indicator 430, a range indicator 440 (indicating range to target along the aim point), and a cross-hair grid 450. Different information may be displayed in different forms according to other embodiments. A user can see the display information through the eyepiece of the observation telescope 105.

Figure 5:
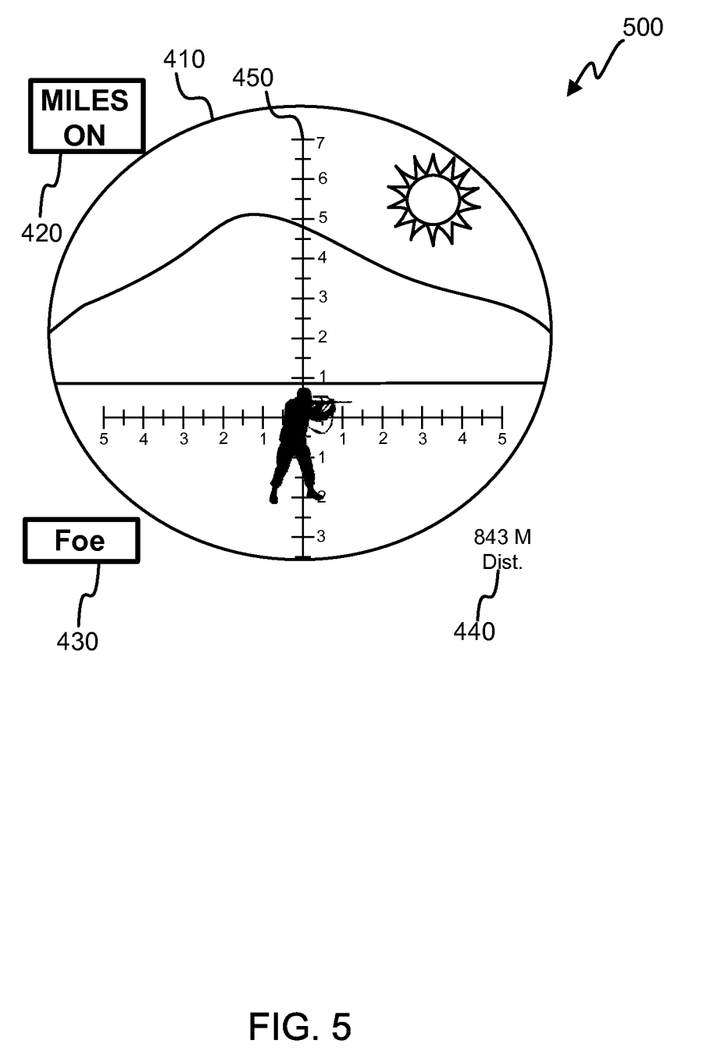
FIG. 5 is a simplified illustration of another image visible through a viewfinder of a multifunction scope.

FIG. 5 is a simplified illustration of another image 500 visible through a viewfinder of an observation telescope 105 of the multifunction scope 100. Here, the observation telescope 105 is in a training/simulation mode, as indicated by the MILES status indicator 420. Depending on desired functionality, the friend or foe status indicator 430 can be active as shown in FIG. 5, or it may be deactivated for training purposes.

FIGS. 4 and 5 are provided as examples and are not limiting. The information displayed in FIGS. 4 and 5 can be shown in numerous forms and formats. For example, the MILES status indicator 420 and/or the friend or foe status indicator 430 can simply be a light or other indicator enabling a quick determination of status. Moreover, any or all of the indicators and/or other information provided in FIGS. 4 and 5 can be located inside the target scene 410. Furthermore, additional information can be provided, such as information received via the laser transceiver 120 and/or RF unit 125, orientation sensors 140 (e.g., heading), location information unit 135 (e.g., current location coordinates), battery life, status of the laser designator 150 and/or IR illuminator, etc.

Figure 6:
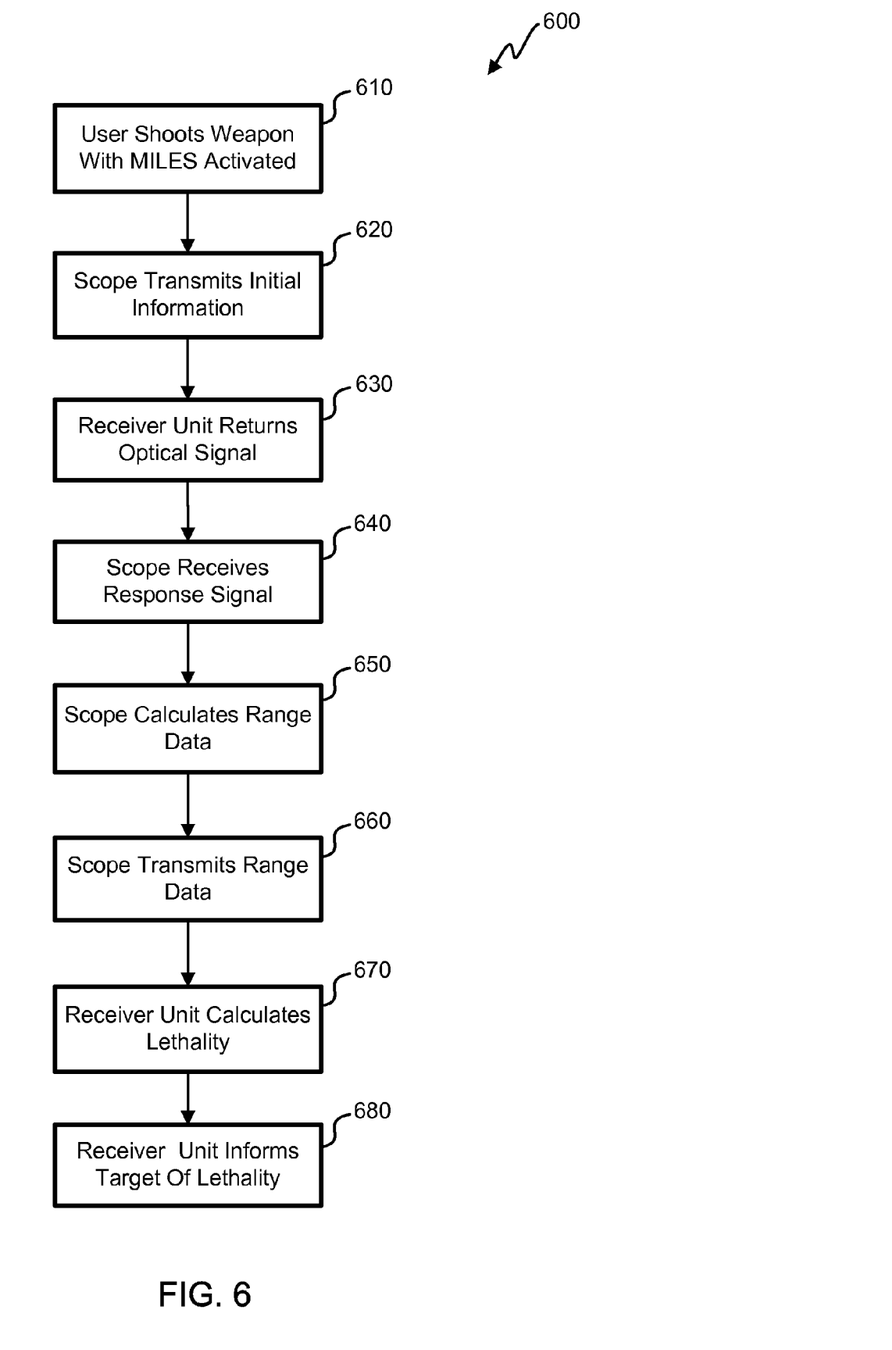
FIG. 6 is a flow diagram illustrating a method for determining lethality of a simulated "hit" using a multifunction scope and a receiver unit, according to a first embodiment.

FIG. 6 is a flow diagram illustrating a method 600 for determining lethality of a simulated "hit" using a multifunction scope 100 and a receiver unit 130, according to a first embodiment. At block 610, a user shoots a weapon coupled with a multifunction scope 100 with MILES activated. At block 620, multifunction scope 100 transmits initial information toward a receiver unit 130, which returns the optical signal at block 630.

The initial exchange of information in blocks 620 and 630 between the multifunction scope 100 and the receiver unit 130 can include a variety of information. For example, the multifunction scope 100 can transmit identification information. Additionally or alternatively, the receiver unit can modulate the optical signal to include identification, location, and/or other information of the receiver unit 130.

At block 640, the multifunction scope 100 receives the response signal from the receiver unit 130. The multifunction scope 100 can then, at block 650, use location information received from the receiver unit to calculate range data, or distance of the multifunction scope 100 to the receiver unit 130. At block 660, the multifunction scope 100 transmits range data back to the receiver unit 130, which then uses the range and other information to calculate the lethality of the shot, at block 670. At block 680, the receiver unit 130 can then inform the target, which can be a soldier wearing the receiver unit 130, of the lethality. Based on the functionality of the receiver unit 130, this can be a signal provided by audio, visual, and or other means.

Figure 7:
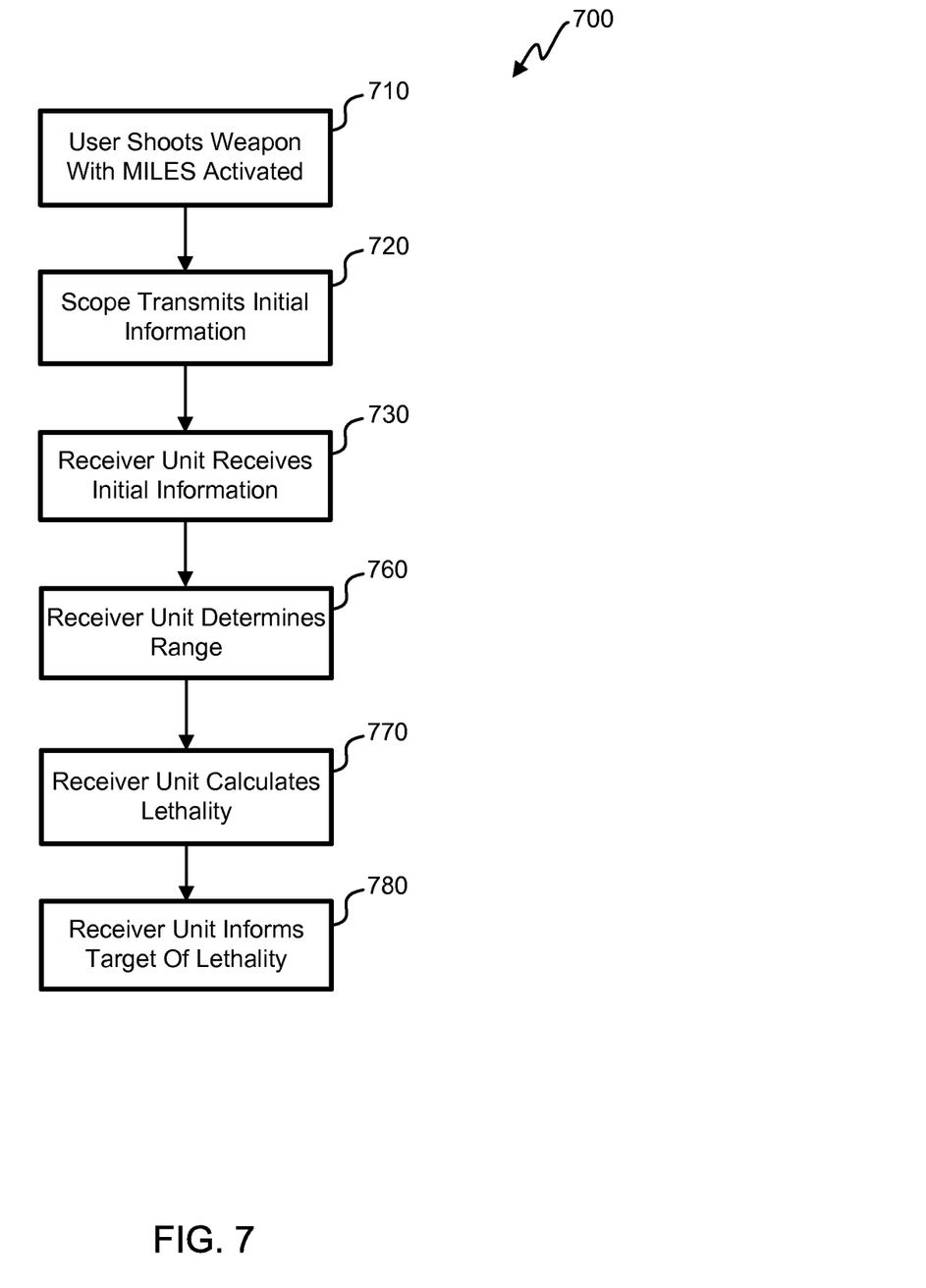
FIG. 7 is a flow diagram illustrating a method for determining lethality of a simulated "hit" using a multifunction scope and a receiver unit, according to a second embodiment.

FIG. 7 is a flow diagram illustrating a method 700 for determining lethality of a simulated "hit" using a multifunction scope 100 and a receiver unit 130, according to a second embodiment. Similar to the method 600 illustrated in FIG. 6, a user shoots a weapon coupled with a multifunction scope 100 with MILES activated at block 710, the multifunction scope 100 transmits initial information at block 720, and the initial information is received by the receiver unit 130 at block 730. Here, however, the receiver unit determines the range of the multifunction scope 100 at block 760. If the initial information includes location information coordinates of the multifunction scope 100 (e.g., GPS coordinates), the receiver unit 130 can use its own location information to determine a range. On the other hand, if the initial information received from the multifunction scope includes identification, the receiver unit 130 can use the identification to look up location information of the multifunction scope 100 from a central source, such as a central server (e.g., computer) communicatively coupled with both the multifunction scope 100 and the receiver unit 130. With the range determined, the receiving unit can calculate lethality, at block 770, and inform a target of the lethality, at block 780.

Of course, many variations may be made to the methods 600, 700 of FIGS. 6 and 7. Differing functionality can depend on, among other things, the processing and connectivity capabilities of the receiver unit 130 and/or multifunction scope 100. Alternative embodiments can include, for example, a multifunction scope 100 receiving information regarding where the "hit" was received by the target, calculating lethality of a shot, and transmitting the lethality information to a receiver unit.

While a multifunction scope 100 for optical combat identification and other uses is described herein with reference to particular blocks, it is to be understood that the blocks are defined for convenience of description and are not intended to imply a particular physical arrangement of component parts. Further, the blocks need not correspond to physically distinct components.

Circuits, logic modules, processors, and/or other components may be described herein as being "configured" to perform various operations. Those skilled in the art will recognize that, depending on implementation, such configuration can be accomplished through design, setup, interconnection, and/or programming of the particular components and that, again depending on implementation, a configured component might or might not be reconfigurable for a different operation. For example, a programmable processor can be configured by providing suitable executable code; a dedicated logic circuit can be configured by suitably connecting logic gates and other circuit elements; and so on.

Computer programs incorporating various features of the present invention may be encoded on various computer readable storage media; suitable media include magnetic media, optical media, flash memory, and the like. Computer-readable storage media encoded with the program code may be packaged with a compatible device or provided separately from other devices. In addition program code may be encoded and transmitted via wired optical, and/or wireless networks conforming to a variety of protocols, including the Internet, thereby allowing distribution, e.g., via Internet download.

While the embodiments described above may make reference to specific hardware and software components, those skilled in the art will appreciate that different combinations of hardware and/or software components may also be used and that particular operations described as being implemented in hardware might also be implemented in software or vice versa.

What is claimed is:

1. A weapon-mounted optical scope configured to operate in a combat mode and a training mode, the weapon-mounted optical scope comprising:
    an observation telescope configured for viewing of an image of a target;
    a laser transceiver coupled to the observation telescope and configured to communicate using an optical signal;
    an identity determination unit communicatively coupled to the laser transceiver and configured to make a determination regarding the target based, at least in part, on identification information received using the laser transceiver;
    a simulation unit communicatively coupled to the laser transceiver and configured to transmit simulation information, using the laser transceiver, when the weapon-mounted optical scope is operating in the training mode; and
    a location information unit communicatively coupled with the simulation unit and configured to calculate location information indicative of a location of the weapon-mounted optical scope;
    wherein:
    the observation telescope, laser transceiver, identity determination unit, simulation unit, and location information unit, are physically incorporated into the weapon-mounted optical scope;
    the laser transceiver is configured to receive data indicative of the location of a receiver unit, and communicate the data to the simulation unit; and
    the simulation unit is configured to use the data and the location information to determine a distance of the receiver unit from the weapon-mounted optical scope.

2. The weapon-mounted optical scope configured to operate in the combat mode and the training mode recited in claim 1, wherein the simulation unit is configured to include the location information in the simulation information.

3. The weapon-mounted optical scope configured to operate in the combat mode and the training mode recited in claim 1, wherein the simulation unit is configured to transmit distance information regarding the distance of the receiver unit using the laser transceiver.

4. The weapon-mounted optical scope configured to operate in the combat mode and the training mode recited in claim 1, further comprising an indicator configured to communicate to a user whether the weapon-mounted optical scope is operating in the training mode.

5. The weapon-mounted optical scope configured to operate in the combat mode and the training mode recited in claim 4, further comprising a radio frequency (RF) unit configured to transmit the location information.

6. The weapon-mounted optical scope configured to operate in the combat mode and the training mode recited in claim 1, wherein the laser transceiver is configured to generate a laser beam having a wavelength of approximately 1550 nm.

7. The weapon-mounted optical scope configured to operate in the combat mode and the training mode recited in claim 1, wherein, the location information unit comprises a global positioning system (GPS) receiver.

* * * * *

UNITED STATES PATENT AND TRADEMARK OFFICE
CERTIFICATE OF CORRECTION

| | |
|---|---|
| PATENT NO. | : 9,068,798 B2 |
| APPLICATION NO. | : 13/186058 |
| DATED | : June 30, 2015 |
| INVENTOR(S) | : Tony Maryfield et al. |

Page 1 of 1

It is certified that error appears in the above-identified patent and that said Letters Patent is hereby corrected as shown below:

On the Title Page of the Patent:

Item (56), under "FOREIGN PATENT DOCUMENTS", 3rd foreign reference down, please delete "GA" and insert --FR--.

Signed and Sealed this
Twenty-fourth Day of November, 2015

Michelle K. Lee
*Director of the United States Patent and Trademark Office*